United States Patent [19]
Olszewski et al.

[11] Patent Number: 6,041,620
[45] Date of Patent: Mar. 28, 2000

[54] CRYOGENIC INDUSTRIAL GAS LIQUEFACTION WITH HYBRID REFRIGERATION GENERATION

[75] Inventors: Walter Joseph Olszewski, Amherst; Bayram Arman, Grand Island; Arun Acharya, East Amherst; Joseph Alfred Weber, Cheektowaga; Mohammad Abdul-Aziz Rashad, Buffalo, all of N.Y.

[73] Assignee: Praxair Technology, Inc., Danbury, Conn.

[21] Appl. No.: 09/222,814

[22] Filed: Dec. 30, 1998

[51] Int. Cl.[7] .................................................. F25B 7/00
[52] U.S. Cl. ................... 62/612; 62/613; 62/619
[58] Field of Search ......................... 62/612, 613, 619

[56] References Cited

U.S. PATENT DOCUMENTS

| | | | |
|---|---|---|---|
| 3,733,845 | 5/1973 | Lieberman | 62/335 |
| 3,932,154 | 1/1976 | Coers et al. | 62/9 |
| 3,970,441 | 7/1976 | Etzbach et al. | 62/612 |
| 4,325,231 | 4/1982 | Krieger | 62/612 |
| 4,566,886 | 1/1986 | Fabian et al. | 62/619 |
| 5,157,925 | 10/1992 | Denton et al. | 62/11 |
| 5,441,658 | 8/1995 | Boyarsky et al. | 252/67 |
| 5,579,654 | 12/1996 | Longsworth et al. | 62/511 |

*Primary Examiner*—Ronald Capossela
*Attorney, Agent, or Firm*—Stanley Ktorides

[57] ABSTRACT

A method for liquefying an industrial gas wherein a portion of the requisite refrigeration is generated by a multicomponent refrigerant circuit and a portion is generated by turboexpansion of either a portion of the industrial gas or a portion of the multicomponent refrigerant.

18 Claims, 3 Drawing Sheets

CRYOGENIC INDUSTRIAL GAS LIQUEFACTION WITH HYBRID REFRIGERATION GENERATION

TECHNICAL FIELD

This invention relates generally to cryogenic liquefaction of industrial gases and, more particularly, to the provision of refrigeration for carrying out the cryogenic liquefaction.

BACKGROUND ART

Liquefaction of industrial gases requires the provision of refrigeration for cooling and liquefying the industrial gas. Typically such refrigeration is provided by the turboexpansion of a portion of the industrial gas stream with subsequent heat exchange of the turboexpanded portion with the remainder of the industrial gas to liquefy that remaining portion. Turboexpansion is an energy intensive step and it is quite costly especially when larger amounts of refrigeration are required.

Accordingly it is an object of the invention to provide a system for providing refrigeration for liquefying an industrial gas wherein not all of the requisite refrigeration for liquefying the gas is generated by turboexpansion of a portion of the industrial gas.

SUMMARY OF THE INVENTION

The above and other objects, which will become apparent to those skilled in the art upon reading of this disclosure are attained by the present invention, one aspect of which is:

A method for liquefying an industrial gas comprising:

(A) compressing an industrial gas, cooling the compressed industrial gas to produce cooled industrial gas, turboexpanding a first portion of the compressed, cooled industrial gas to generate refrigeration, and at least partially condensing a second portion of the compressed, cooled industrial gas by indirect heat exchange with the turboexpanded first portion to produce liquefied industrial gas;

(B) compressing a multicomponent refrigerant fluid comprising at least two components, cooling the compressed multicomponent refrigerant fluid, expanding the compressed, cooled multicomponent refrigerant fluid to produce refrigeration, and warming the refrigeration bearing expanded multicomponent refrigerant fluid by indirect heat exchange with said cooling compressed industrial gas; and (C) recovering liquefied industrial gas as product.

Another aspect of the invention is:

A method for liquefying an industrial gas comprising:

(A) compressing an industrial gas, turboexpanding a first portion of the compressed industrial gas to generate refrigeration, cooling a second portion of the compressed industrial gas by indirect heat exchange with the turboexpanded first portion, and further cooling the cooled second portion of the industrial gas to produce liquefied industrial gas;

(B) compressing a multicomponent refrigerant fluid comprising at least two components, cooling the compressed multicomponent refrigerant fluid, expanding the compressed, cooled multicomponent refrigerant fluid to produce refrigeration, and warming the refrigeration bearing expanded multicomponent refrigerant fluid by indirect heat exchange with said further cooling second portion of the industrial gas; and (C) recovering liquefied industrial gas as product.

Yet another aspect of the invention is:

A method for liquefying an industrial gas comprising:

(A) compressing a multicomponent refrigerant fluid comprising at least two components, turboexpanding a first portion of the compressed multicomponent refrigerant fluid to generate refrigeration, and warming the turboexpanded first portion of the multicomponent refrigerant fluid by indirect heat exchange with industrial gas to produce cooled industrial gas;

(B) further compressing a second portion of the compressed multicomponent refrigerant fluid, expanding the further compressed second portion of the multicomponent refrigerant fluid to generate refrigeration, and warming the expanded second portion of the multicomponent refrigerant fluid by indirect heat exchange with the cooled industrial gas to produce liquefied industrial gas, and (C) recovering liquefied industrial gas as product.

As used herein the term "non-toxic" means not posing an acute or chronic hazard when handled in accordance with acceptable exposure limits.

As used herein the term "non-flammable" means either having no flash point or a very high flash point of at least 600° K.

As used herein the term "non-ozone-depleting" means having zero-ozone depleting potential, i.e. having no chlorine, bromine or iodine atoms.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° K, preferably at least 20° K and most preferably at least 50° K.

As used herein the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), hexafluorocyclopropane (cyclo-$C_3F_6$) and octafluorocyclobutane (cyclo-$C_4F_8$).

As used herein the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_5HF_{11}$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethene ($C_2H_2F_2$), trifluoroethene ($C_2HF_3$), fluoroethene ($C_2H_3F$), pentafluoropropene ($C_3HF_5$), tetrafluoropropene ($C_3H_2F_4$), trifluoropropene ($C_3H_3F_3$), difluoropropene ($C_3H_4F_2$), heptafluorobutene ($C_4HF_7$), hexafluorobutene ($C_4H_2F_6$) and nonafluoropentene ($C_5HF_9$).

As used herein the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2-tetrafluoroethane ($CF_3$—O—$C_2H_2F_4$), difluoromethoxy-1,1,2,2-tetrafluoroethane ($CHF_2$—O—$C_2HF_4$), perfluoroethoxy-fluoromethane ($C_2F_5$—O—$CH_2F$), perfluoromethoxy-1,1,2-trifluoroethane ($CF_3$—O—$C_2H_2F_3$), perfluoromethoxy-1,2,2-trifluoroethane ($CF_3$—O—$C_2H_2F_3$), cyclo-1,1,2,2-tetrafluoropropylether (cyclo-$C_3H_2F_4$—O—), cyclo-1,1,3,3-tetrafluoropropylether (cyclo-$C_3H_2F_4$—O—), perfluoromethoxy-1,1,2,2-tetrafluoroethane ($CF_3$—O—$C_2HF_4$), cyclo-1,1,2,3,3-pentafluoropropylether (cyclo-$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo-$CF_2$—O—$CF_2$—O—$CF_2$—) and cyclo-perfluoropropylether (cyclo-$C_3F_6$—O).

As used herein the term "atmospheric gas" means one of the following: nitrogen ($N_2$), argon (Ar), krypton (Kr), xenon (Xe), neon (Ne), carbon dioxide ($CO_2$), oxygen ($O_2$) and helium (He).

As used herein the term "low-ozone-depleting" means having an ozone depleting potential less than 0.15 as defined by the Montreal Protocol convention wherein dichlorofluoromethane ($CCl_2F_2$) has an ozone depleting potential of 1.0.

As used herein the term "normal boiling point" means the boiling temperature at 1 standard atmosphere pressure, i.e. 14.696 pounds per square inch absolute.

As used herein the term "indirect heat exchange" means the bringing of fluids into heat exchange relation without any physical contact or intermixing of the fluids with each other.

As used herein the term "expansion" means to effect a reduction in pressure.

As used herein the term "turboexpansion" and "turboexpander" means respectively method and apparatus for the flow of high pressure fluid through a turbine to reduce the pressure and the temperature of the fluid thereby generating refrigeration.

As used herein the term "industrial gas" means nitrogen, oxygen, argon, hydrogen, helium, carbon dioxide, carbon monoxide, methane and fluid mixtures containing two or more thereof.

As used herein the term "cryogenic temperature" means a temperature of 150° K or less.

As used herein the term "refrigeration" means the capability to reject heat from a subambient temperature system to the surrounding atmosphere.

DETAILED DESCRIPTION

In the practice of this invention turboexpansion is employed to provide only a portion of the refrigeration needed over the large temperature range to liquefy an industrial gas, with the remaining requisite refrigeration provided by a multicomponent refrigerant which provides variable amounts of refrigeration over the required temperature range, thereby improving the overall efficiency of the liquefaction. An added benefit, in addition to the high efficiency, is that the multicomponent refrigerant is preferably non-toxic, non-flammable and non-ozone depleting. In a preferred embodiment of the invention each of the two or more components of the multicomponent refrigerant mixture has a normal boiling point which differs by at least 5 degrees Kelvin from the normal point of every other component in the refrigerant mixture. This enhances the effectiveness of providing refrigeration over a wide temperature range which encompasses cryogenic temperatures. In another preferred embodiment of the invention, the normal boiling point of the highest boiling component of the multicomponent refrigerant mixture is at least 50 degrees Kelvin greater than the normal boiling point of the lowest boiling component of the multicomponent refrigerant mixture.

Figure 1:
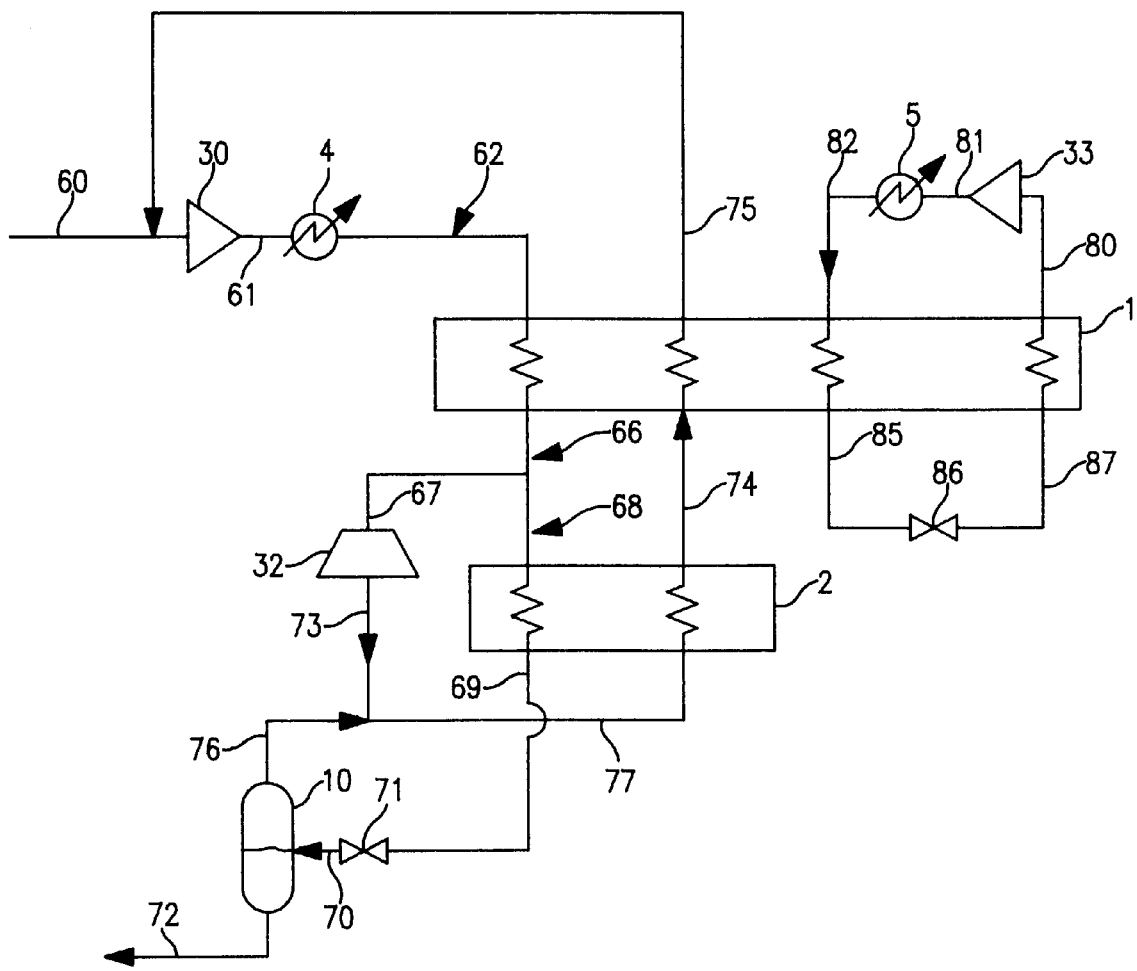
FIG. 1 is a schematic representation of one preferred embodiment of the invention wherein the multicomponent refrigerant provides higher temperature level refrigeration and turboexpansion of the industrial gas provides lower temperature level refrigeration for the liquefaction.

The invention will be discussed in further detail with reference to the Drawings. Referring now to FIG. 1, multicomponent refrigerant fluid 80 is compressed by passage through compressor 33 to a pressure generally within the range of from 100 to 1000 pounds per square inch absolute (psia). Compressed multicomponent refrigerant fluid 81 is cooled of the heat of compression in aftercooler 5 and resulting multicomponent refrigerant fluid 82 is passed through heat exchanger 1 wherein it is further cooled and preferably condensed. Resulting multicomponent refrigerant liquid 85 is throttled through valve 86 wherein it is expanded to a pressure generally within the range of from 15 to 100 psia thus generating refrigeration. The pressure expansion of the fluid through valve 86 provides refrigeration by the Joule-Thomson effect, i.e. lowering of the fluid temperature due to pressure reduction at constant enthalpy. Typically the temperature of expanded multicomponent refrigerant fluid 87 will be within the range of from 150 to 250° K. The expansion of the multicomponent refrigerant fluid through valve 86 also causes a portion of the fluid to vaporize.

Refrigeration bearing multicomponent two phase refrigerant fluid in stream 87 is then passed through heat exchanger 1 wherein it is warmed and completely vaporized thus serving by indirect heat exchange to cool the compressed multicomponent refrigerant fluid. The warming of fluid 87 also serves to cool industrial gas as will be more fully described below. The resulting warmed multicomponent refrigerant fluid in vapor stream 80, which is generally at a temperature within the range of from 280 to 320° K, is recycled to compressor 33 and the refrigeration cycle starts anew.

Industrial gas, e.g. nitrogen, in stream 60 is compressed by passage through compressor 30 to a pressure generally within the range of from 50 to 900 psia, and resulting industrial gas stream 61 is cooled of the heat of compression by passage through aftercooler 4. Compressed industrial gas stream 62 is then passed through heat exchanger 1 wherein it is cooled by indirect heat exchange with multicomponent refrigerant fluid 87.

Resulting cooled industrial gas 66 is divided into a first portion 67 and a second portion 68. First portion 67 is turboexpanded by passage through turboexpander 32 to a pressure generally within the range of from 15 to 150 psia to generate refrigeration. Resulting turboexpanded refrigeration bearing stream 73 is withdrawn from turboexpander 32 and passed in stream 77 through heat exchanger 2 wherein it is warmed by indirect heat exchange with the second portion as will be more fully described below. Resulting warmed stream 74 is passed from heat exchanger 2 through heat exchanger 1 for further warming and then as stream 75 passed into stream 60 for recycle to compressor 30.

Second portion 68 is passed through heat exchanger 2 wherein it is further cooled and at least partially condensed by indirect heat exchange with the turboexpanded first portion and the resulting fluid is passed in stream 69 through valve 71 and as stream 70 into phase separator 10. If stream 69 is all liquid, the passage through valve 71 will serve to vaporize some of the liquid so that stream 70 is a two phase stream. Vapor is passed out from phase separator 10 in stream 76 and combined with stream 73 to form stream 77 for handling as was previously described. Liquid is passed out from separator 10 in stream 72 to a use point and/or storage as product liquefied industrial gas.

Figure 2:
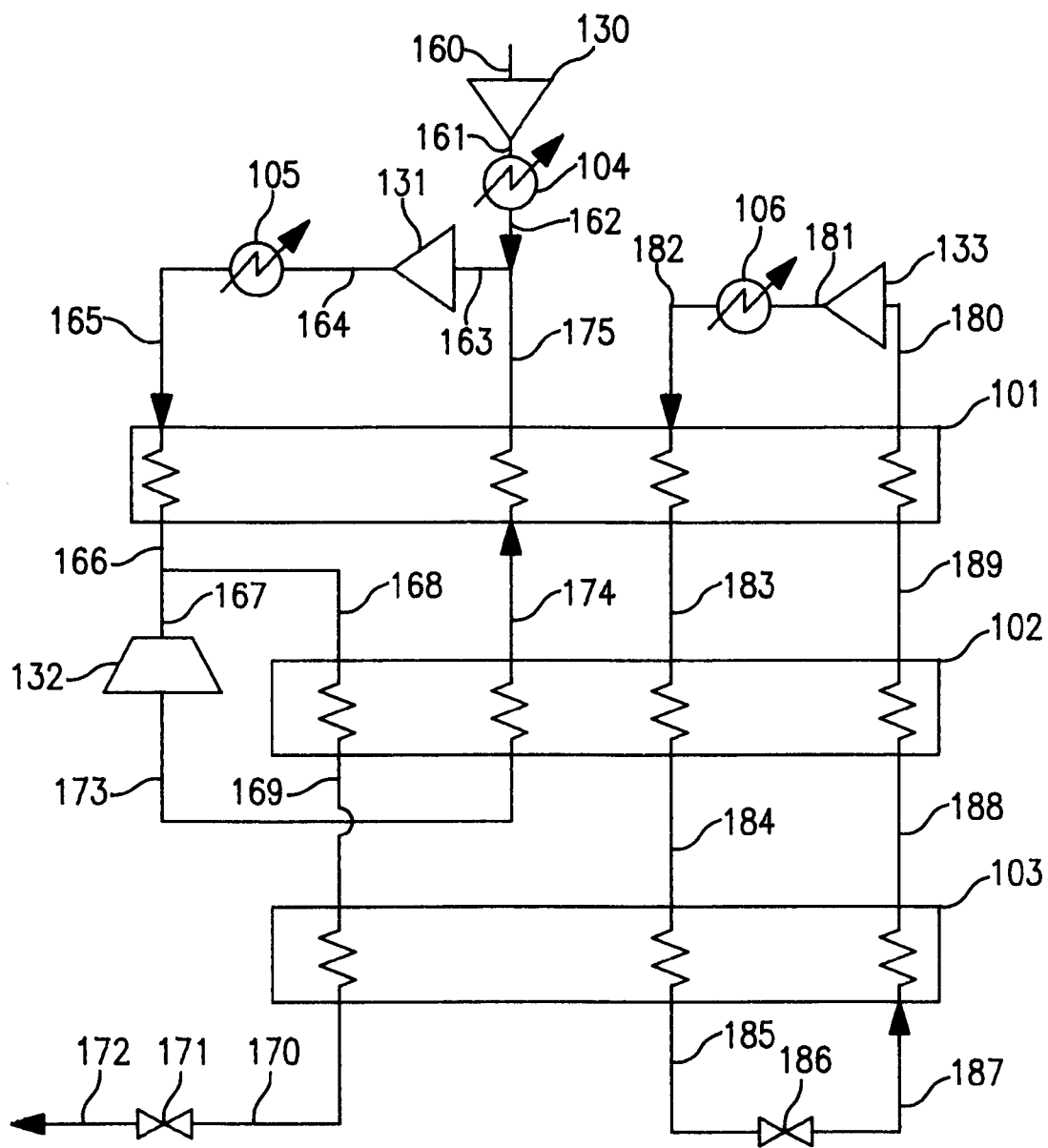
FIG. 2 is a schematic representation of another preferred embodiment of the invention wherein the multicomponent refrigerant provides lower temperature refrigeration and turboexpansion of the industrial gas provides higher temperature level refrigeration for the liquefaction.

In the embodiment of the invention illustrated in FIG. 2 the multicomponent refrigerant fluid circuit serves to primarily provide lower temperature level refrigeration for the industrial gas liquefaction. Referring now to FIG. 2, multicomponent refrigerant fluid 180 is compressed by passage through compressor 133 to a pressure generally within the range of from 100 to 600 psia. Compressed multicomponent refrigerant fluid 181 is cooled of the heat of compression in aftercooler 105 and resulting multicomponent refrigerant fluid is passed as shown by streams 182, 183, 184 and 185 through heat exchangers 101, 102 and 103 wherein it is further cooled and preferably condensed. Resulting multicomponent refrigerant liquid 185 is throttled through valve 186 wherein it is expanded to a pressure generally within the range of from 15 to 100 psia thus generating refrigeration. The pressure expansion of the fluid through valve 186 provides refrigeration by the Joule-Thomson effect. Typically the temperature of expanded multicomponent refrigerant fluid 187 will be within the range of from 80 to 120° K. The expansion of multicomponent refrigerant fluid through valve 186 also causes a portion of the fluid to vaporize.

Refrigeration bearing multicomponent two phase refrigerant fluid in stream 187 is then passed through heat exchangers 103, 102 and 101 as shown by stream 188 and 189 wherein it is warmed and completely vaporized thus serving by indirect heat exchange to cool the compressed multicomponent refrigerant fluid.

The warming of fluid 187 also serves to cool and liquefy industrial gas as will be more fully described below. The resulting warmed multicomponent refrigerant fluid in vapor stream 180, which is generally at a temperature within the range of from 280 to 320° K is recycled to compressor 133 and the refrigeration cycle starts anew.

Industrial gas, e.g. nitrogen, in stream 160 is compressed by passage through compressor 130 to a pressure generally within the range of from 30 to 150 psia, and resulting industrial gas stream 161 is cooled of the heat of compression by passage through aftercooler 104. Compressed industrial gas stream 162 is then passed as stream 163 to compressor 131 wherein it is further compressed to a pressure generally within the range of from 80 to 900 psia. Resulting further compressed stream 164 is cooled of the heat of compression in aftercooler 105 and resulting stream 165 is then passed through heat exchanger 101 wherein it is cooled by indirect heat exchange with turboexpanded second portion 174 and with multicomponent refrigerant fluid 189.

Resulting cooled industrial gas 166 is divided into a first portion 167 and a second portion 168. First portion 167 is turboexpanded by passage through turboexpander 132 to a pressure generally within the range of from 30 to 300 psia to generate refrigeration. Resulting turboexpanded refrigeration bearing stream 173 is withdrawn from turboexpander 132 and passed through heat exchanger 102 wherein it is warmed by indirect heat exchange with the second portion as will be more fully described below. Resulting warmed stream 174 is passed from heat exchanger 102 through heat exchanger 101 for further warming and then as stream 175 passed into stream 162 to form stream 163 for recycle to compressor 130.

Second portion 168 is passed through heat exchanger 102 wherein it is further cooled and may be partially condensed by indirect heat exchange with the turboexpanded first portion and the resulting fluid is passed in stream 169 through heat exchanger 103 wherein it is completely condensed by indirect heat exchange with refrigeration bearing multicomponent refrigerant fluid 187 to form liquefied industrial gas 170. The resulting liquefied industrial gas is then passed through valve 171 and as stream 172 to a use point and/or to storage.

Although the system illustrated in FIG. 2 utilizes turboexpansion to primarily provide the high temperature level refrigeration, i.e. the refrigeration needed for heat exchangers 101 and 102, it is understood that some of the required refrigeration can be provided by the multicomponent refrigerant fluid circuit. Thus, although the multicomponent refrigerant primarily provides the low temperature level refrigeration, i.e. the refrigeration needed for heat exchanger 103, the multicomponent refrigerant can provide some refrigeration for the other heat exchangers. Also, although the multicomponent refrigerant flow circuit is illustrated as a single closed loop flow circuit, it could utilize internal recycle of refrigerant liquid. An intermediate temperature level phase separation could be utilized to recover and recycle, i.e. rewarm refrigerant liquid whereas the vapor portion could be further cooled prior to rewarming. The liquid recycle feature provides process flexibility regarding refrigerant components and compositions, and can avoid any liquid freezing problems.

Figure 3:
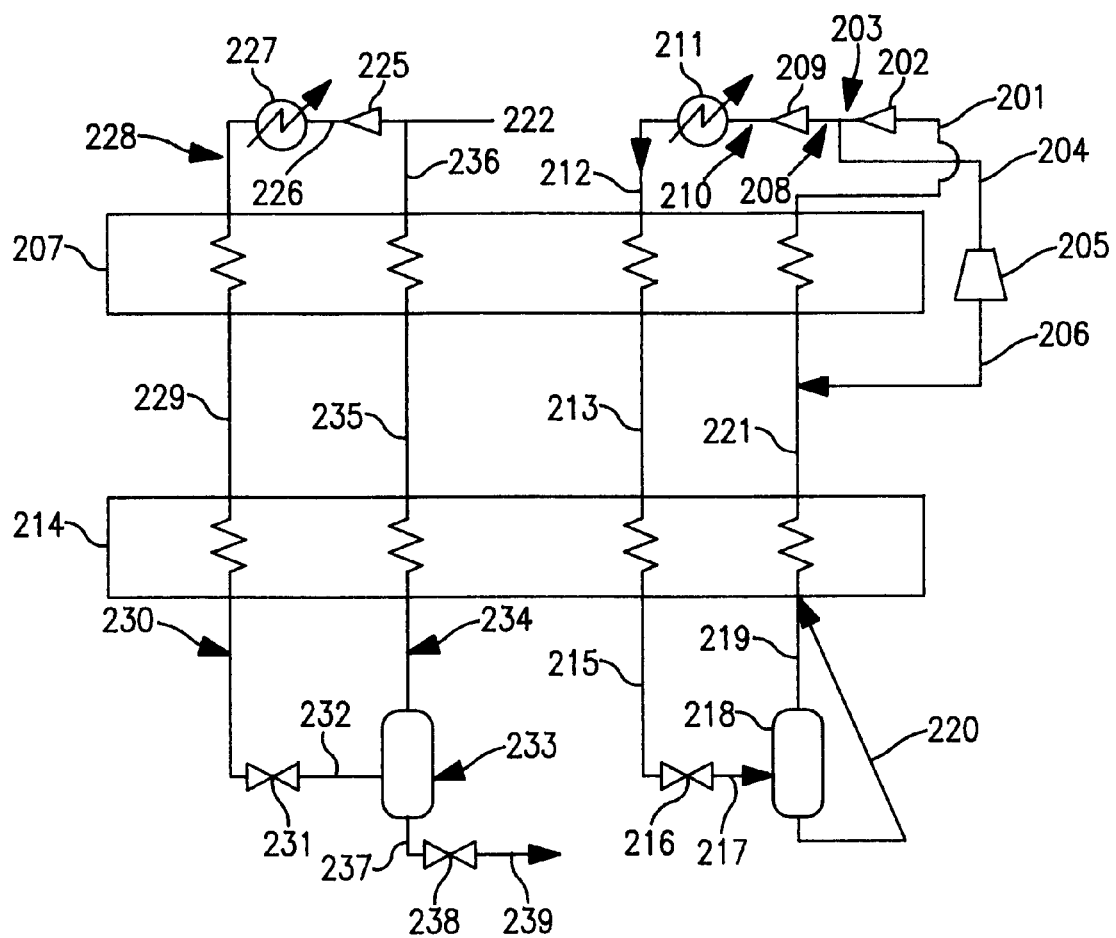
FIG. 3 is a schematic representation of another preferred embodiment of the invention wherein the multicomponent refrigerant provides both lower temperature level and higher temperature level refrigeration for the liquefaction and wherein a part of the refrigeration is provided by turboexpansion of the multicomponent refrigerant.

In the embodiment of the invention illustrated in FIG. 3 the multicomponent refrigerant fluid circuit serves to provide both higher temperature level and lower temperature level refrigeration for the industrial gas liquefaction. Referring now to FIG. 3, multicomponent refrigerant fluid 201 is compressed by passage through compressor 202 to a pressure generally within the range of from 100 to 300 psia. A first portion 204 of resulting compressed stream 203 is turboexpanded by passage through turboexpander 205 to a pressure generally within the range of from 20 to 50 psia thereby generating refrigeration. Resulting turboexpanded refrigeration bearing stream 206 is passed into the warming leg of the multicomponent refrigerant cooling circuit and passed through heat exchanger 207 wherein it is warmed by indirect heat exchange with industrial gas thereby cooling the industrial gas. The resulting warmed first portion is withdrawn from heat exchanger 207 and passed in stream 201 for recycle to compressor 202.

A second portion 208 of compressed multicomponent refrigerant fluid 203 is further compressed by passage through compressor 209 to a pressure generally within the range of from 100 to 600 psia. Resulting further compressed stream 210 is cooled of the heat of compression by passage through aftercooler 211 and resulting stream 212 is passed through heat exchanger 207 wherein it is cooled by indirect heat exchange with the refrigeration bearing turboexpanded first portion of the multicomponent refrigerant fluid. Resulting cooled second portion 213 is further cooled and preferably condensed by passage through heat exchanger 214. The further cooled multicomponent refrigerant fluid 215 is then expanded through valve 216 to generate refrigeration by the Joule-Thomson effect. Preferably, as illustrated in FIG. 3, the expansion of stream 215 through valve 216 causes some of the fluid to vaporize so that resulting stream 217 is a two phase stream. Stream 217 is passed into phase separator 218 and both vapor in stream 219 and liquid in stream 220 are passed from phase separator 218 into the cold end of heat exchanger 214. Within heat exchanger 214 the refrigeration bearing second portion of the multicomponent refrigerant fluid is warmed and preferably completely vaporized by indirect heat exchange with cooled industrial gas. The warming second portion of the multicomponent refrigerant fluid also serves to cool the second portion 213 as was previously described. Resulting warmed second portion 221 is passed out of heat exchanger 214 and is combined with first portion 206 for warming by passage through heat exchanger 207 and then in stream 201 for recycle to compressor 202.

Industrial gas in stream 222 is compressed by passage through compressor 225 to a pressure generally within the range of from 100 to 900 psia. Resulting compressed industrial gas stream 226 is cooled of the heat of compression by passage through aftercooler 227 and resulting pressurized industrial gas stream 228 is cooled by indirect heat exchange in heat exchanger 207 with the warming turboexpanded first portion of the multicomponent refrigerant fluid as well as with the warming second portion. Resulting cooled industrial gas stream 229 is further cooled and at least partially liquefied by indirect heat exchange in heat exchanger 214 with the warming expanded second portion of the multicomponent refrigerant fluid. Resulting at least partially liquefied industrial gas 230 is passed through valve 231 and then as stream 232 into phase separator 233. Industrial gas vapor from phase separator 233 is passed in streams 234, 235 and 236 through heat exchangers 214 and 207 wherein it is warmed to assist in the cooling and liquefaction of the industrial gas, and then passed into stream 222 for recycle in the liquefaction circuit. Industrial gas liquid is withdrawn from phase separator 233 in stream 237, passed through valve 238 and in stream 239 to a use point and/or to storage.

The multicomponent refrigerant fluid useful in the practice of this invention contains at least two components in order to provide the required refrigeration at each temperature. The choice of refrigerant components will depend on the refrigeration load versus temperature for the particular process application. Suitable components will be chosen depending upon their normal boiling points, latent heat, and flammability, toxicity, and ozone-depletion potential.

One preferable embodiment of the multicomponent refrigerant fluid useful in the practice of this invention comprises at least one component from the group consisting of fluorocarbons, hydrofluorocarbons and fluoroethers and at least one component from the group consisting of fluorocarbons, hydrofluorocarbons, fluoroethers and atmospheric gases.

Another preferable embodiment of the multicomponent refrigerant fluid useful in the practice of this invention comprises at least one component from the group consisting of fluorocarbons, hydrofluorocarbons and fluoroethers and at least one atmospheric gas.

Another preferable embodiment of the multicomponent refrigerant fluid useful in the practice of this invention comprises at least two components from the group consisting of fluorocarbons, hydrofluorocarbons and fluoroethers and at least one atmospheric gas.

Another preferable embodiment of the multicomponent refrigerant fluid useful in the practice of this invention comprises at least two components from the group consisting of fluorocarbons, hydrofluorocarbons and fluoroethers, and at least two atmospheric gases.

Another preferable embodiment of the multicomponent refrigerant fluid useful in the practice of this invention comprises at least one fluoroether and at least one component from the group consisting of fluorocarbons, hydrofluorocarbons, fluoroethers and atmospheric gases.

In one preferred embodiment the multicomponent refrigerant fluid consists solely of fluorocarbons. In another preferred embodiment the multicomponent refrigerant fluid consists solely of fluorocarbons and hydrofluorocarbons. In another preferred embodiment the multicomponent refrigerant fluid consists solely of fluorocarbons and atmospheric gases. In another preferred embodiment the multicomponent refrigerant fluid consists solely of fluorocarbons, hydrofluorocarbons and fluoroethers. In another preferred embodiment the multicomponent refrigerant fluid consists solely of fluorocarbons, fluoroethers and atmospheric gases.

Although the multicomponent refrigerant fluid useful in the practice of this invention may contain other components such as hydrochlorofluorocarbons and/or hydrocarbons, preferably the multicomponent refrigerant fluid contains no hydrochlorofluorocarbons. In another preferred embodiment of the invention the multicomponent refrigerant fluid contains no hydrocarbons, and most preferably the multicomponent refrigerant fluid contains neither hydrochlorofluorocarbons nor hydrocarbons. Most preferably the multicomponent refrigerant fluid is non-toxic, non-flammable and non-ozone-depleting and most preferably every component of the multicomponent refrigerant fluid is either a fluorocarbon, hydrofluorocarbon, fluoroether or atmospheric gas.

The invention is particularly advantageous for use in efficiently reaching cryogenic temperatures from ambient temperatures. Tables 1–5 list preferred examples of multicomponent refrigerant fluid mixtures useful in the practice of this invention. The concentration ranges given in Tables 1–5 are in mole percent.

TABLE 1

| COMPONENT | CONCENTRATION RANGE |
|---|---|
| $C_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 2

| COMPONENT | CONCENTRATION RANGE |
|---|---|
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |
| Ne | 0–10 |
| He | 0–10 |

TABLE 3

| COMPONENT | CONCENTRATION RANGE |
|---|---|
| $C_3H_3F_5$ | 5–25 |
| $C_3H_2F_6$ | 0–15 |
| $C_2H_2F_4$ | 5–20 |
| $C_2HF_5$ | 5–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 4

| COMPONENT | CONCENTRATION RANGE |
|---|---|
| $CHF_2$—O—$C_2HF_4$ | 5–25 |
| $C_4F_{10}$ | 0–15 |
| $CF_3$—O—$CHF_2$ | 10–40 |
| $CF_3$—O—$CF_3$ | 0–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 5

| COMPONENT | CONCENTRATION RANGE |
|---|---|
| $C_3H_3F_5$ | 5–25 |
| $C_3H_2F_6$ | 0–15 |
| $CF_3$—O—$CHF_3$ | 10–40 |
| $CHF_3$ | 0–30 |
| $CF_4$ | 0–25 |
| Ar | 0–40 |
| $N_2$ | 10–80 |
| Ne | 0–10 |
| He | 0–10 |

The invention is especially useful for providing refrigeration over a wide temperature range, particularly one which encompasses cryogenic temperatures. In a preferred embodiment of the invention each of the two or more components of the refrigerant mixture has a normal boiling point which differs by at least 5 degrees Kelvin, more preferably by at least 10 degrees Kelvin, and most preferably by at least 20 degrees Kelvin, from the normal boiling point of every other component in that refrigerant mixture. This enhances the effectiveness of providing refrigeration over a wide temperature range, particularly one which encompasses cryogenic temperatures. In a particularly preferred embodiment of the invention, the normal boiling point of the highest boiling component of the multicomponent refrigerant fluid is at least 50° K, preferably at least 100° K, most preferably at least 200° K, greater than the normal boiling point of the lowest boiling component of the multicomponent refrigerant fluid.

The components and their concentrations which make up the multicomponent refrigerant fluid useful in the practice of this invention are such as to form a variable load multicomponent refrigerant fluid and preferably maintain such a variable load characteristic throughout the whole temperature range operable by the method of the invention. This markedly enhances the efficiency with which the refrigeration can be generated and utilized over such a wide temperature range. The defined preferred group of components has an added benefit in that they can be used to form fluid mixtures which are non-toxic, non-flammable and low or non-ozone-depleting. This provides additional advantages over conventional refrigerants which typically are toxic, flammable and/or ozone-depleting.

One preferred variable load multicomponent refrigerant fluid useful in the practice of this invention which is non-toxic, non-flammable and non-ozone-depleting comprises two or more components from the group consisting of $C_5F_{12}$, $CHF_2$—O—$C_2HF_4$, $C_4$ $HF_9$, $C_3$ $H_3$ $F_5$, $C_2F_5$—$OCH_2F$, $C_3H_3F_5$, $C_3H_2F_6$, $CHF_2$—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He.

Although the invention has been described in detail with reference to certain preferred embodiments, those skilled in the art will recognize that there other embodiments of the invention within the spirit and the scope of the claims.

We claim:

1. A method for liquefying an industrial gas comprising:
   (A) compressing an industrial gas, cooling the compressed industrial gas to produce cooled industrial gas, turboexpanding a first portion of the compressed, cooled industrial gas to generate refrigeration, and at least partially condensing a second portion of the compressed, cooled industrial gas by indirect heat exchange with the turboexpanded first portion to produce liquefied industrial gas;
   (B) compressing a multicomponent refrigerant fluid comprising at least two components, cooling the compressed multicomponent refrigerant fluid, expanding the compressed, cooled multicomponent refrigerant fluid to produce refrigeration, and warming the refrigeration bearing expanded multicomponent refrigerant fluid by indirect heat exchange with said cooling compressed industrial gas; and
   (C) recovering liquefied industrial gas as product.

2. The method of claim 1 wherein the multicomponent refrigerant fluid comprises at least one component from the group consisting of fluorocarbons, hydrofluorocarbons and fluoroethers and at least one component from the group consisting of fluorocarbons, hydrofluorocarbons, fluoroethers and atmospheric gases.

3. The method of claim 1 wherein the multicomponent refrigerant fluid comprises at least two components from the group consisting of fluorocarbons, hydrofluorocarbons and fluoroethers and at least one atmospheric gas.

4. The method of claim 1 wherein the multicomponent refrigerant fluid comprises at least two components from the group consisting of fluorocarbons, hydrofluorocarbons and fluoroethers and at least two atmospheric gases.

5. The method of claim 1 wherein the multicomponent refrigerant fluid comprises at least one fluoroether and at least one component from the group consisting of fluorocarbons, hydrofluorocarbons, fluoroethers and atmospheric gases.

6. A method for liquefying an industrial gas comprising:

(A) compressing an industrial gas, turboexpanding a first portion of the compressed industrial gas to generate refrigeration, cooling a second portion of the compressed industrial gas by indirect heat exchange with the turboexpanded first portion, and further cooling the cooled second portion of the industrial gas to produce liquefied industrial gas;

(B) compressing a multicomponent refrigerant fluid comprising at least two components, cooling the compressed multicomponent refrigerant fluid, expanding the compressed, cooled multicomponent refrigerant fluid to produce refrigeration, and warming the refrigeration bearing expanded multicomponent refrigerant fluid by indirect heat exchange with said further cooling second portion of the industrial gas; and (C) recovering liquefied industrial gas as product.

7. The method of claim 6 wherein the compressed industrial gas is cooled prior to the turboexpansion by indirect heat exchange with multicomponent refrigerant fluid after the multicomponent refrigerant fluid has passed in indirect heat exchange with the further cooling second portion of the industrial gas.

8. The method of claim 6 wherein the multicomponent refrigerant fluid comprises at least one component from the group consisting of fluorocarbons, hydrofluorocarbons and fluoroethers and at least one component from the group consisting of fluorocarbons, hydrofluorocarbons, fluoroethers and atmospheric gases.

9. The method of claim 6 wherein the multicomponent refrigerant fluid comprises at least two components from the group consisting of fluorocarbons, hydrofluorocarbons and fluoroethers and at least one atmospheric gas.

10. The method of claim 6 wherein the multicomponent refrigerant fluid comprises at least two components from the group consisting of fluorocarbons, hydrofluorocarbons and fluoroethers and at least two atmospheric gases.

11. The method of claim 6 wherein the multicomponent refrigerant fluid comprises at least one fluoroether and at least one component from the group consisting of fluorocarbons, hydrofluorocarbons, fluoroethers and atmospheric gases.

12. A method for liquefying an industrial gas comprising:

(A) compressing a multicomponent refrigerant fluid comprising at least two components, turboexpanding a first portion of the compressed multicomponent refrigerant fluid to generate refrigeration, and warming the turboexpanded first portion of the multicomponent refrigerant fluid by indirect heat exchange with industrial gas to produce cooled industrial gas;

(B) further compressing a second portion of the compressed multicomponent refrigerant fluid, expanding the further compressed second portion of the multicomponent refrigerant fluid to generate refrigeration, and warming the expanded second portion of the multicomponent refrigerant fluid by indirect heat exchange with the cooled industrial gas to produce liquefied industrial gas, and (C) recovering liquefied industrial gas as product.

13. The method of claim 12 further comprising cooling the further compressed second portion of the multicomponent refrigerant fluid prior to expansion by indirect heat exchange with the warming turboexpanded first portion of the multicomponent refrigerant fluid.

14. The method of claim 12 further comprising precooling the industrial gas by indirect heat exchange with the second portion of the multicomponent refrigerant fluid after said second portion of the multicomponent refrigerant fluid has passed in indirect heat exchange with the cooled industrial gas.

15. The method of claim 12 wherein the multicomponent refrigerant fluid comprises at least one component from the group consisting of fluorocarbons, hydrofluorocarbons and fluoroethers and at least one component from the group consisting of fluorocarbons, hydrofluorocarbons, fluoroethers and atmospheric gases.

16. The method of claim 12 wherein the multicomponent refrigerant fluid comprises at least two components from the group consisting of fluorocarbons, hydrofluorocarbons and fluoroethers and at least one atmospheric gas.

17. The method of claim 12 wherein the multicomponent refrigerant fluid comprises at least two components from the group consisting of fluorocarbons, hydrofluorocarbons and fluoroethers and at least two atmospheric gases.

18. The method of claim 12 wherein the multicomponent refrigerant fluid comprises at least one fluoroether and at least one component from the group consisting of fluorocarbons, hydrofluorocarbons, fluoroethers and atmospheric gases.

* * * * *